United States Patent
Kerscher et al.

(10) Patent No.: US 11,993,824 B2
(45) Date of Patent: May 28, 2024

(54) METHOD FOR PRODUCING A SHEET METAL COMPONENT

(71) Applicant: Bayerische Motoren Werke Aktiengesellschaft, Munich (DE)

(72) Inventors: Martin Kerscher, Dornwang (DE); Markus Pfestorf, Neufahrn (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 173 days.

(21) Appl. No.: 16/404,859

(22) Filed: May 7, 2019

(65) Prior Publication Data
US 2019/0352734 A1 Nov. 21, 2019

(30) Foreign Application Priority Data
May 15, 2018 (DE) ...................... 10 2018 207 488.7

(51) Int. Cl.
*C21D 9/48* (2006.01)
*B21D 22/02* (2006.01)
(Continued)

(52) U.S. Cl.
CPC ............. *C21D 9/48* (2013.01); *B21D 22/022* (2013.01); *B21D 22/208* (2013.01); *B21D 39/00* (2013.01);
(Continued)

(58) Field of Classification Search
CPC . C21D 9/48; C21D 1/18; C21D 1/673; C21D 2211/001; B62D 25/04;
(Continued)

(56) References Cited

U.S. PATENT DOCUMENTS

2002/0069506 A1* 6/2002 Brodt .................. B21D 35/007
29/505
2006/0137779 A1* 6/2006 Brodt ..................... C21D 1/673
148/567
(Continued)

FOREIGN PATENT DOCUMENTS

CN 102453791 A 5/2012
CN 104340277 A 2/2015
(Continued)

OTHER PUBLICATIONS

German Search Report issued in German Application No. 10 2018 207 488.7 dated Jan. 19, 2021 with partial English translation (11 pages).
(Continued)

Primary Examiner — Adil A. Siddiqui
(74) Attorney, Agent, or Firm — Crowell & Moring LLP

(57) ABSTRACT

A method for producing a sheet metal component, in particular a motor vehicle structural component, includes the following steps: providing a basic structure consisting of a hot formable material, arranging at least one reinforcing structure in a region to be reinforced of the basic structure, preliminarily or definitively fixing the reinforcing structure to the basic structure, in particular by an integrally bonded connection, cold forming the basic structure with the reinforcing structure arranged thereon, and press hardening the basic structure with the reinforcing structure arranged thereon.

6 Claims, 1 Drawing Sheet

(51) Int. Cl.
  *B21D 22/20* (2006.01)
  *B21D 28/02* (2006.01)
  *B21D 39/00* (2006.01)
  *B21D 53/88* (2006.01)
  *B62D 21/02* (2006.01)
  *B62D 25/00* (2006.01)
  *B62D 25/04* (2006.01)
  *B62D 29/00* (2006.01)
  *C21D 1/18* (2006.01)
  *C21D 1/673* (2006.01)

(52) U.S. Cl.
  CPC ............. *B21D 53/88* (2013.01); *B62D 25/04* (2013.01); *B62D 29/007* (2013.01); *C21D 1/18* (2013.01); *C21D 1/673* (2013.01); *B21D 28/02* (2013.01); *B62D 21/02* (2013.01); *B62D 25/00* (2013.01); *C21D 2211/001* (2013.01)

(58) Field of Classification Search
  CPC ...... B62D 21/02; B62D 29/007; B62D 25/00; B21D 22/022; B21D 22/208; B21D 53/88; B21D 28/02; B21D 39/00; B21D 25/00

See application file for complete search history.

(56) References Cited

U.S. PATENT DOCUMENTS

| | | | |
|---|---|---|---|
| 2006/0219334 | A1* | 10/2006 | Brodt ..................... B21D 35/00 |
| | | | 148/647 |
| 2007/0175040 | A1 | 8/2007 | Bayer et al. |
| 2019/0084273 | A1* | 3/2019 | Pieronek ................. B32B 37/18 |

FOREIGN PATENT DOCUMENTS

| | | | |
|---|---|---|---|
| DE | 100 49 660 A1 | 4/2002 | |
| DE | 103 33 166 A1 | 2/2005 | |
| DE | 10 2004 054 795 B4 | 4/2007 | |
| WO | WO-2017050558 A1 * | 3/2017 | ........... B32B 15/011 |

OTHER PUBLICATIONS

Chinese Office Action issued in Chinese application No. 201910332784.0 dated Jul. 29, 2022, with English translation (Fourteen (14) pages).

* cited by examiner

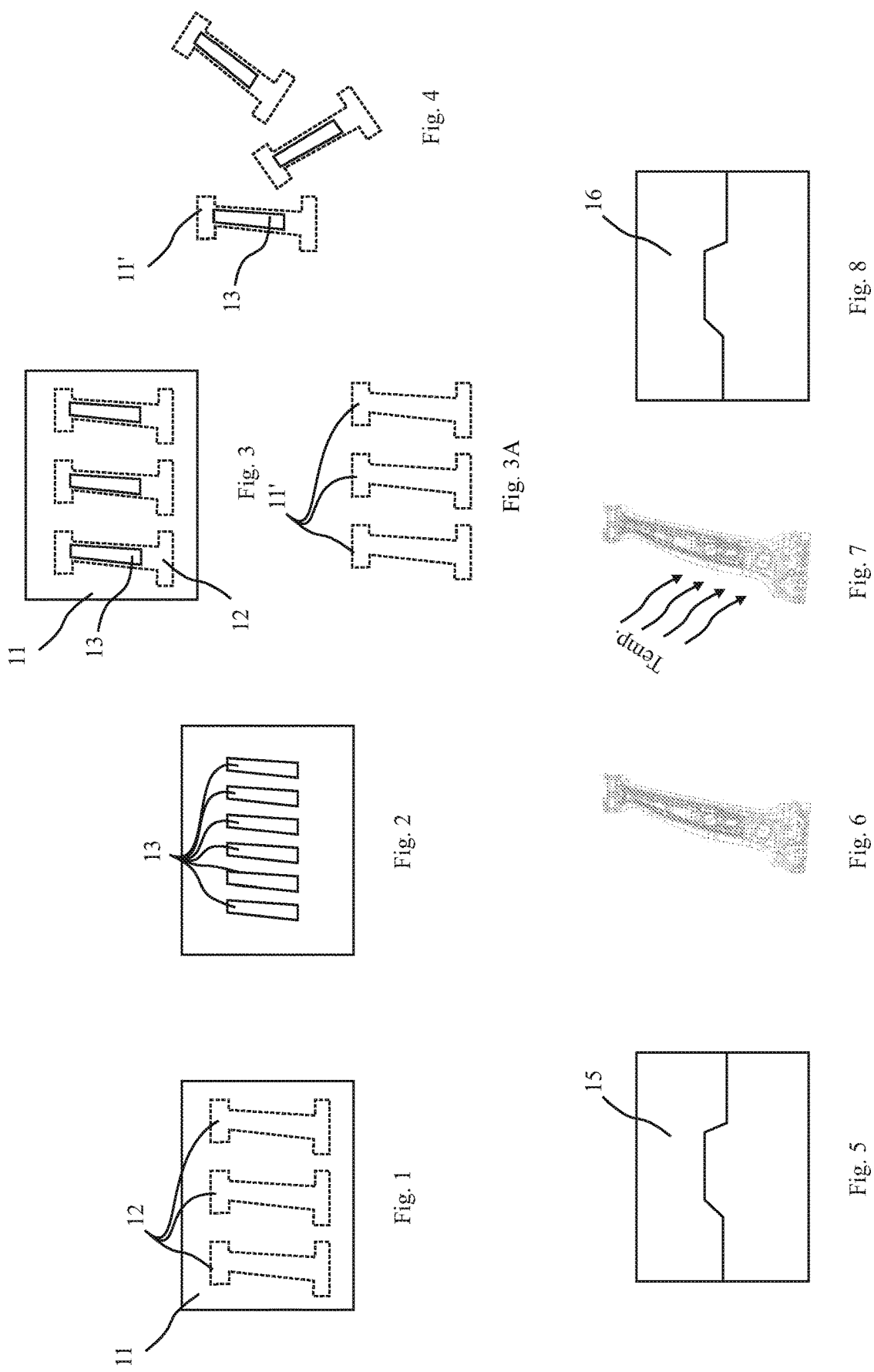

METHOD FOR PRODUCING A SHEET METAL COMPONENT

CROSS REFERENCE TO RELATED APPLICATION

This application claims priority under 35 U.S.C. § 119 from German Patent Application No. 10 2018 207 488.7, filed May 15, 2018, the entire disclosure of which is herein expressly incorporated by reference.

BACKGROUND AND SUMMARY OF THE INVENTION

The present invention relates to a method for producing a sheet metal component, in particular a motor vehicle structural component.

In order to meet the current requirements for crash safety, body structures of contemporary motor vehicles are reinforced in specific regions. The local reinforcement makes it possible for a thinner-walled material to be used in all other regions, and therefore the overall weight of the body structure is reduced. Only hot-formed or press-hardened steels are used as reinforcement in the body framework of a vehicle structure. Press-hardened shaped sheet metal parts which are used, for example, as structural components for motor vehicle bodies, and methods for producing same are known from the prior art. During the press hardening, a steel sheet material which is suitable for press hardening is shaped in a press hardening tool and cooled by quenching, as a result of which high strengths of up to 1600 MPa and more can be achieved. In the side frame, essentially the A pillar, the B pillar and the sill reinforcements are produced in this manner. For the press hardening, use can also be made of what are referred to as tailored welded blanks (TWB). This is understood as meaning in particular that the starting blank used is formed from individual sheet metal pieces which are welded to one another (or are optionally also soldered together) or from partial blanks having different sheet metal thicknesses, as described, for example, in DE 10 2004 054 795 B4. In the case of press-hardened components or hot-formed components, only a tailored welded blank can be used for a local reinforcement, or a reinforcement can be produced with the aid of an additional component.

The use of a tailored welded blank correspondingly causes additional costs depending on the formation of the required laser seam. Furthermore, the laser weld seam present on the tailored welded blank restricts the design freedom. In the alternative use of an additional component, additional component costs and additional manufacturing outlays arise since a further reinforcing component has to be connected to the structural component during the bodywork production process.

Starting from this prior art, it is the object of the present invention to provide a simplified method in which the complexity of the individual method steps is reduced.

This and other objects are achieved according to the invention by a method for producing a sheet metal component, in particular a motor vehicle structural component. The method has at least the following steps: providing a basic structure consisting of a hot-formable material; arranging at least one reinforcing structure in a region to be reinforced of the basic structure; preliminarily or definitively fixing the reinforcing structure to the basic structure, in particular by way of an integrally bonded connection; cold-forming the basic structure with the reinforcing structure arranged thereon; and press-hardening the basic structure with the reinforcing structure arranged thereon. Motor vehicle structural components within the context of this invention are, in particular, longitudinal members, crossmembers, A, B, C and D pillars, sills, roof side frames, roof bows, etc.

This affords the advantage that the reinforcing structure and the basic structure are formed together and therefore two components are produced which lie in an absolutely precisely fitting manner on each other. Furthermore, these components are already connected to each other in an integrally bonded manner, for example by welding. Furthermore, in comparison to a conventional multi-part solution, a set of tools can be saved. Of course, a plurality of reinforcing structures can be arranged on a basic structure if a plurality of regions of the basic structure are intended to be reinforced. Said regions can be connected to one another or can be discretely separated from one another.

According to a first alternative of the method, the basic structure is preliminarily fixed to the reinforcing structure by way of individual tacking points. This affords the advantage of an accelerated production method if preliminary fixing of the basic structure suffices for the positionally precise positioning and orientation of the basic structure and the reinforcing structure with respect to one another.

In a second alternative of the method, for the definitive fixing, the basic structure can be completely circumferentially spot-welded to the reinforcing structure along the circumference of the reinforcing structure. This affords the advantage that a complete definitive connection of the basic structure to the reinforcing structure is realized even before the forming and press-hardening steps.

In both method alternatives, a low-melting material can optionally additionally be introduced between the basic structure and the reinforcing structure before the spot welding. This material melts during the press hardening and connects the basic structure and the reinforcing structure flatly to each other during the cooling. The material can be designed as a blank, in particular as an adhesive film, metal foil, zinc foil or temperature-resistant plastic. Alternatively, the material can also be designed as a paste, in particular as a soldering paste, for example made from copper or brass. In a further alternative, the material can be in powder form. In all of the alternatives described above, instead of a continuous film/foil or blank wetting/covering the reinforcing structure over a large area, the material can also be applied to the reinforcing structure or the basic structure merely in sections. In regions in which the basic structure and the reinforcing structure are in contact with each other after the joining, what are referred to as material deposits are created. In this connection, accumulations of powder or paste or individual material blanks are applied in an adhering manner to the basic structure or to the reinforcing structure. This can preferably take place in a desired pattern. During the press hardening, these deposits melt and produce one or more local connections between the two components. By provision of this material, the component rigidity of the assembly can be increased.

Furthermore, in each case 22MnB5 or 20MnB8 can be used as the hot-formable material for the basic structure and/or the reinforcing structure. 22MnB5 is a steel material which is suitable for the hot-forming, but which requires high cooling speeds. In order to avoid microcracks caused by forming sheets with a zinc coating, preliminary cooling of the blank from approx. 900° C. to approx. 600° C. has to be carried out during the direct process. In comparison to 22MnB5, during use in the hot-forming process, galvanized steel of grade 20MnB8 affords the advantage that cooling speeds of such a high level are not required.

Furthermore, the basic structure and/or the reinforcing structure can have a zinc coating or a zinc-iron coating. In contrast to the blanks used in the prior art having an aluminum-silicon coating, the galvanized surface affords the advantage that the zinc coating or the zinc-iron coating ensures cathodic corrosion protection of the component. The forming and press hardening of a galvanized blank preferably takes place in a two-stage indirect method, as a result of which both the sheet metal surface and the press hardening tool are subject to less loading.

The basic structure can be heated with the reinforcing structure arranged thereon to an austenitizing temperature of substantially 900° C. before the press hardening and can then be press hardened. This affords the advantage that both the basic structure and the reinforcing structure are hardened and therefore a comparatively hard material structure is produced in both components.

According to the method, the reinforcing structure is designed as a patch. In this connection, one or more patches are cut out of a starting blank and then serve as a reinforcing structure.

In a first variant of the method, the basic structure is designed as a substantially flat main component which is cut out from a starting blank. In this connection, one or more main components are cut out of a starting blank. One or more reinforcing structures are then arranged in an integrally bonded manner on said main component.

In a second variant of the method, the reinforcing structure which is cut out of the starting blank is adhesively bonded onto the starting blank of the basic structure before the basic structure is cut out of its starting blank.

Furthermore, after the cold forming of the basic structure with the reinforcing structure arranged thereon, the semi-finished product which is thus produced can then be completed by trimming. All that is then needed is for the basic structure with the reinforcing structure arranged thereon to be heated in a furnace to a temperature of substantially 900° C. This affords the advantage that trimming of the component can be carried out before the hardening and therefore still substantially in the soft state of the material. Alternatively or additionally, at least the basic structure can be finally trimmed to a desired edge contour after the press hardening. This final trimming step affords the advantage that a possible distortion during the press hardening can be corrected.

The invention permits very good adaptation of the vehicle structural component to the loading to be anticipated since the reinforcing structure or the reinforcing structures can be applied specifically only where a reinforcement is required. Up to now, large sheet metal thicknesses have been provided at loaded points or in loaded regions, with the relevant regions for method reasons generally being larger in area than the actual loading requires. The invention therefore provides more degrees of freedom both for the design of components and for the production. Furthermore, the sheet metal thickness of the main component can be reduced at the relevant point (i.e. where at least one reinforcing structure is applied), thus resulting in savings on weight. However, the possibility of reducing the sheet metal thickness also leads to the differences in sheet metal thickness being smaller, as a result of which advantages arise during forming and press hardening, in particular in respect of the design of the tool. However, the smaller differences in sheet metal thickness also have advantages during the heating for the subsequent press hardening. Firstly, the required heating energy and time is are reduced. Secondly, overheating is prevented. This is because the heating time is focused on the thickest region with the greatest sheet metal thickness, and therefore thinner regions with smaller sheet metal thicknesses may overheat.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 1 shows a basic structure according to a first variant of the method.

FIG. 2 shows a blank with a plurality of reinforcing structures.

FIG. 3 shows a basic structure according to the first variant of the method with reinforcing structures arranged thereon.

FIG. 3A shows a basic structure according to a second variant of the present invention.

FIG. 4 shows basic structures with reinforcing structures arranged thereon.

FIG. 5 shows a cold forming tool.

FIG. 6 shows a semi-finished product directly after the cold forming.

FIG. 7 shows the heating process in a furnace.

FIG. 8 shows a press hardening tool.

DETAILED DESCRIPTION OF THE DRAWINGS

FIG. 1 shows a basic structure 11, designed here as a starting blank. Outlines 12 are marked on the blank. These outlines are, by way of example, starting elements for producing B pillars.

FIG. 2 shows a second starting blank on which reinforcing structures 13 can be seen. Such reinforcing structures 13 are produced as patches from the blank, for example by punching out, trimming, etc.

According to a first variant of the method that is illustrated in FIG. 3, the patches 13 separated from their starting blank are applied to the basic structure 11 or to the starting blank, on which the B pillar starting elements 12 are shown, in predetermined regions. After the forming and press hardening, such predetermined regions form those portions of the B pillar which have to satisfy particularly exacting mechanical requirements. The application takes place by the reinforcing structures 13 being fastened to the basic structure 11 by an integrally bonded connection. Such an integrally bonded connection can take place by welding, preferably by spot welding, adhesive bonding, brazing or similar methods. After the reinforcing structure 13 is applied to the basic structure 11, the outlines 12 are punched or cut out of the starting blank. The semi-finished products produced therefrom are depicted in FIG. 4, in which the basic structure 11' which has now been produced is depicted, with the reinforcing structure 13 arranged thereon.

According to a second variant of the method, one or more basic structures 11' are cut out of the starting blank 11, which is shown in FIG. 1, along the contour lines 12. These basic structures 11' are depicted in FIG. 3A. As in the first variant of the method, the reinforcing structures 13 are adhesively bonded on in a predetermined region of the basic structure, thus resulting in the semi-finished products shown in FIG. 4.

In other words, the two variants of the method are distinguished in that, in the first variant, first of all the reinforcing patches 13 are adhesively bonded onto the starting blank and then the basic structures 11 are cut out of the starting blank, and, in the second variant, first of all the basic structures 11' are cut out of the starting blank and then the reinforcing structure 13 are applied.

The semi-finished product is then plastically formed in a cold forming step. FIG. 5 shows such a forming tool 15 which has an upper and a lower tool half in the form of a female mold and a male mold. The semi-finished products illustrated in FIG. 4 are introduced between the tool halves and mechanically formed. The three-dimensionally formed component blank which is thus produced is illustrated in FIG. 6. This blank can be brought to a shape close to the final contours or to a final contour shape optionally by means of trimming.

According to FIG. 7, the three-dimensionally cold-formed semi-finished product is then heated in a furnace or in another suitable heating device and brought to an austenitizing temperature within the range above the AC3 temperature of approx. 900° C. The semi-finished product heated in such a manner is introduced into a press hardening tool according to FIG. 8 and cooled. The press hardening tool 16 comprises an upper and a lower tool half. The press-hardened semi-finished product is finally removed from the press hardening tool 16. Mechanical machining steps, such as deburring, drilling, trimming and the like, can optionally also follow.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for producing a sheet metal component, the method comprising the steps of:
    providing a basic structure consisting of a hot formable material, wherein the basic structure is a first starting blank;
    marking an outline on the first starting blank, wherein the outline is a starting element for producing a B-pillar of a motor vehicle;
    cutting out of a patch from a second starting blank;
    applying the patch to the first starting blank within the outline on the first starting blank by preliminarily or definitively fixing the patch to the first starting blank via an integrally bonded connection such that the patch is a reinforcing structure of the B-pillar of the motor vehicle;
    after the patch is applied to the first starting blank within the outline on the first starting blank, the outline on the first starting blank with the patch applied thereto is cut out of the first starting blank to form a semi-finished product;
    cold forming the semi-finished product in a cold forming step by mechanically forming the semi-finished product in a forming tool having an upper tool half and a lower tool half;
    after the cold forming, trimming the semi-finished product;
    after the trimming, heating the semi-finished product in a furnace to an austenitizing temperature of substantially 900° C. before press hardening; and
    following the heating, introducing the heated semi-finished product into a press hardening tool having an upper tool half and a lower tool half and press hardening the semi-finished product in the press hardening tool;
    wherein 20MnB8 is used as the hot formable material for the basic structure and the patch.

2. The method as claimed in claim 1, wherein
for the preliminary fixing, the patch is spot welded to the first starting blank by way of individual tacking points.

3. The method as claimed in claim 1, wherein
for the definitive fixing, the patch is completely circumferentially spot welded to the first starting blank.

4. The method as claimed in claim 1, further comprising the step of:
    introducing a low melting material between the patch and the first starting blank before spot welding the patch to the first starting blank.

5. The method as claimed in claim 1, wherein
the basic structure and/or the patch has a zinc coating or a zinc-iron coating.

6. The method as claimed in claim 1, wherein
after the press hardening, removing the semi-finished product from the press hardening tool and finally trimming the press-hardened semi-finished product to a desired edge contour.

\* \* \* \* \*